United States Patent Office 2,999,071
Patented Sept. 5, 1961

2,999,071
PROCESS FOR THE REACTIVATION OF ALUMINUM CHLORIDE-HYDROCARBON CATALYST
Frederick E. Frey, Bartlesville, Okla., assignor to Phillips Petroleum Company, a corporation of Delaware
No Drawing. Filed Apr. 26, 1954, Ser. No. 425,760
13 Claims. (Cl. 252—415)

This invention relates to a process for restoring the activity of an aluminum chloride-hydrocarbon complex catalyst which has become degraded, for example, during the conversion of hydrocarbons. The process comprises treating the complex catalyst in the presence of hydrogen and a metal halide promoter, the metal of which is capable of existing in more than one valence state.

Promoters which can be employed in accordance with the invention are halides of the metals gallium, indium, thallium and tin. Preferably the halide is a chloride or bromide, and the now preferred metal is gallium. Accordingly, in one of its aspects, the invention relates to an improved hydrogenation process for the restoration of the catalytic activity of an equilibrium aluminum chloride-hydrocarbon catalyst complex which comprises subjecting said complex to a treatment in the presence of hydrogen employing gallium trichloride as a promoter. Gallium is a member of group IIIB of the periodic table (Mendeleev's), which group consists of gallium, indium and thallium. A copy of the Mendeleev periodic table appears in Kirk-Othmer, "Encyclopedia of Chemical Technology," volume 5, The Inter-Science Encyclopedia, Inc., New York (1950), page 672.

The invention will be described with respect to gallium trichloride as the hydrogenation promoter since this compound is presently preferred.

The use of aluminum halide catalyst for the conversion of organic compounds, e.g., hydrocarbons, either alone or in the presence of such added promoters as hydrogen halides or organic halides, is well known in the art.

Aluminum chloride catalysts have been used, for example, to promote the alkylation of isoparaffins and aromatics with olefins, the isomerization of cycloparaffins, the isomerization of n-paraffins to isoparaffins, the cracking of naphthas and gas-oils, and numerous additional conversion processes wherein hydrocarbons or mixtures of hydrocarbons, particularly those of petroleum origin, are converted to other hydrocarbons of commercially more desirable characteristics with respect to configuration, boiling range, octane number, oxidation stability, and the like. These processes form no part of the invention, are well known in the art, and accordingly will not be further described.

In practically all of these processes the activity of the catalyst during the course of carrying out these processes becomes insufficient to sustain the desired reactions and must be refortified or otherwise reactivated. In the usual practice, some particular catalytic activity level is maintained in the hydrocarbon conversion process and an equilibrium catalyst, in the art sometimes called "spent" catalyst, is withdrawn from the hydrocarbon conversion process. This equilibrium catalyst is a stable complex of aluminum chloride and hydrocarbon residues and has varying properties depending upon the process operation. A withdrawn equilibrium catalyst complex will contain about 50 weight percent or more aluminum chloride and can have a viscosity varying from the very fluid to the very viscous. The catalyst complex is characterized by a relatively strong bonding of the aluminum chloride and the carbonaceous material and by the fact that the carbon-containing material is usually deficient in hydrogen. The discard of this catalyst complex represents a very substantial cost item of a hydrocarbon conversion process, and an economical and effective method of restoring the activity of the catalyst complex is very desirable.

Many methods have been suggested for the recovery of aluminum chloride from equilibrium catalyst complex to be followed by refortification of the catalyst complex. Such methods include distillation, coking, destructive hydrogenation of the aluminum chloride-hydrocarbon catalyst complex to yield aluminum chloride and hydrocarbons, decomposition of the aluminum chloride to aluminum oxide and chlorine, and the like. In some of these methods the primary object is to recover the aluminum chloride free of the hydrocarbon with which it formed a complex material, and in other of these methods the object is limited to increasing the concentration of available aluminum chloride in the equilibrium catalyst.

The present invention provides an improved process for the restoration of the catalytic activity of an equilibrium aluminum chloride-hydrocarbon catalyst complex.

According to the present invention, the activity of an equilibrium aluminum chloride-hydrocarbon complex catalyst is restored by treatment with hydrogen in the presence of gallium trichloride. The hydrogenation process can also be performed in the presence of hydrogen chloride; a minor proportion of aluminum chloride melting point depressant, such as antimony trichloride, sodium chloride, aluminum bromide; a minor proportion of a hydrogen carrier such as aluminum bromide or aluminum iodide. The process of this invention does not result in the recovery of aluminum chloride as such substantially free of hydrocarbon material, but produces an aluminum chloride-hydrocarbon material of increased catalytic activity which usually, but not always, contains both solid and liquid phase product. A portion of the organic material is removed or displaced from the equilibrium or "spent" catalyst during the hydrogenation process of the invention, and can be recovered if desired. The treated aluminum chloride-hydrocarbon complex containing either solid or liquid phase material, or mixed liquid and solid phase material can be utilized by its addition to the equilibrium catalyst complex being used in a hydrocarbon conversion process to maintain the required activity level. Also, the liquid phase product or the liquid phase material separated from the mixed phase product can be added to the catalyst complex being used in some hydrocarbon conversion processes, such as the isomerization of methylcyclopentane, when it is preferred to use the milder liquid catalyst complex alone. Also, the solid phase product, when it is obtained as such or separated from the mixed phase product, can be added to a hydrocarbon conversion process, especially when a more active catalyst is desired.

The hydrogenation process using the gallium trichloride promoter of my invention serves to increase the available aluminum chloride in the treated catalytic material by raising the aluminum chloride concentration in the treated material, increases to 70-72 percent in the liquid phase product and 78-79 percent in the solid phase product having been observed. In a hydrogenation process in which a mixed phase product is formed, the gallium trichloride also increases proportionately the quantity of the solid phase containing the higher concentration of aluminum chloride at the expense of the quantity of the liquid phase product containing the lower concentration of aluminum chloride and, therefore, improves the amount of available aluminum chloride obtained in the treated catalytic material. An important or advantageous result of the use of gallium trichloride in my process is that it also lowers the threshold temperature of the hydrogenation reaction and thereby reduces degradation of the catalyst complex during its regeneration or reactivation.

In the process of this invention, equilibrium aluminum chloride-hydrocarbon complex catalyst is intimately admixed with hydrogen in the presence of a minor proportion (with respect to the catalyst complex) of gallium trichloride. It is generally found that the optimum amount of gallium trichloride to be employed is from about 0.5 to about 20 weight percent of the equilibrium catalyst complex charged to the hydrogenation zone, but preferably 10 weight percent or less is used. The conditions of hydrogenation in the process of the invention can be substantially those ordinarily employed in the hydrogenation of these catalysts. However, as noted, the use of a promoter of the invention reduces the threshold temperature of the hydrogenation reaction. Thus, temperatures considerably lower than those at which hydrogenation of these catalysts has been effected in the absence of a promoter can be employed. A temperature range now ordinarily preferred is from about 175 to about 500° F., more preferably, the temperature range employed ordinarily is from 250 to 400° F. It has been found that best results are obtained at temperatures not greatly above the threshold temperature of the particular hydrogenation reaction in the presence of the promoter of the invention. The residence time in the hydrogenation zone depends, as will be understood, upon the other reaction conditions and the condition of the charge stock. However, the necessary reaction time generally falls within the range from 0.5 to 10 hours, and usually within the range of 2 to 3 hours. The residence time in the hydrogenation zone is preferably chosen to be just sufficient to accomplish the desired catalyst complex reactivation, as unduly prolonging the reaction will bring about undesirable catalyst complex degradation. It has been found that at least one cubic foot of hydrogen (S.T.P.) should be supplied to the hydrogenation zone for every pound of catalyst complex charged thereto, but usually a much larger quantity is employed, as much as 25 cubic feet sometimes being used. As stated, hydrogen chloride can be charged to the hydrogenation zone if desired, and if employed, not more than one weight percent of the catalyst complex charged to the hydrogenation zone is ordinarily used; if employed, usually at least 0.6 weight percent is used. The pressure maintained in the hydrogenation zone will be usually within the range from 500 to 4000 p.s.i.g., while 1500 to 3000 p.s.i.g. is preferred in most cases. Higher or lower temperatures and/or pressures are possible within the scope of the invention.

EXAMPLE I

Equilibrium aluminum chloride-hydrocarbon catalyst complex from a diisopropyl unit (reaction of ethylene with isobutane) was hydrogenated in a reaction vessel at elevated temperature and pressure. Two different samples of catalyst complex were used and the analysis of these samples is as follows:

|  | A | B |
|---|---|---|
| Heat of hydrolysis, cal./gm | 285 | 286 |
| Aluminum chloride, weight percent | 56.5 | 56.1 |
| Aluminum oxide, weight percent | 1.1 | 0.6 |
| Ferrous chloride, weight percent | 0.3 | 0.3 |

The gallium trichloride used to promote the hydrogenation reaction analyzed approximately 99 weight percent gallium trichloride by titration with standard base and its heat of hydrolysis was found to be approximately 277 calories per gram.

The data in Table I summarize the hydrogenation results obtained, both in the presence and absence of a gallium trichloride hydrogenation promoter. In run III gallium trichloride was not used, whereas 6.4 and 1.0 weight percent gallium trichloride promoter was used in runs I and II, respectively. As shown in Table I, the yields of solid phase product were 51.8, 21.9, and 17.9 percent of the charged complex and yields of liquid product were 21.0, 48.7, and 54.2 percent for the runs with 6.4, 1.0 and 0 percent gallium trichloride, respectively. The increase in solid product at the expense of liquid product, which was promoted by the gallium trichloride is advantageous in that, as shown in Table I, the solid product contains a higher percentage of aluminum chloride than does the liquid product and is, as shown by the heats of hydrolysis, a more active catalyst. Assuming the hydrogen consumption to be a measure of the effectiveness of the hydrogenation reaction, a comparison of runs I and III shows that a reduction of the hydrogenation threshold temperature is obtained with gallium trichloride promoter. In run I, 2.3 moles of hydrogen per mole of hydrocarbon, assuming the complex to contain 42 weight percent hydrocarbon and the hydrocarbon to have an average molecular weight of 220, were consumed at a temperature of 331° F., but in run III only 2.0 moles of hydrogen per mole of hydrocarbon was consumed at 343° F. in the same length of time.

Table I—*Gallium trichloride-promoted hydrogenation of spent aluminum chloride-hydrocarbon complex*

| Run | I | | II | | III | |
|---|---|---|---|---|---|---|
| Charge: | | | | | | |
| Complex, g | 61.80 | | 65.64 | | 63.64 | |
| GaCl₃, g | 4.20 | | 0.642 | | 0 | |
| GaCl₃, Wt. Percent | 6.4 | | 1.0 | | 0 | |
| GaCl₃, Mol Percent of AlCl₃ | 8.4 | | 1.3 | | 0 | |
| HCl, Mol Percent of H₂ | 1.15 | | 1.16 | | 0 | |
| Warm-Up Period, Hr | 0.8 | | 0.5 | | 0.5 | |
| | | | | | | |
| Period | 1 | 2 | 1 | 2 | 1 | 2 |
| Duration, Hr | 0.5 | 2.5 | 0.5 | 2.5 | 0.5 | 2.5 |
| Avg. Temperature, °F | 247 | 331 | 320 | 345 | 283 | 343 |
| Max. Temperature, °F | 250 | 337 | 328 | 349 | 329 | 349 |
| Avg. Pressure, p.s.i.g | 2,570 | 2,350 | 2,700 | 2,200 | 2,570 | 2,440 |
| Hydrogen Consumption: ᵃ | | | | | | |
| Mole | 0.0 | 0.27 | 0.028 | 0.31 | 0.022 | 0.243 |
| Mole/Mole of Hc ᵇ | 0.0 | 2.3 | 0.2 | 2.5 | 0.2 | 2.0 |
| | | | | | | |
| Total, Mole/Mole of Hc | 2.3 | | 2.7 | | 2.2 | |
| | | | | | | |
| Conversion, Wt. Percent of Complex: | | | | | | |
| To Solid Product | 51.8 | | 21.9 | | 17.9 | |
| To Liquid Product | 21.0 | | 48.7 | | 54.2 | |
| To Light Hydrocarbon ᶜ | 25.6 | | 26.7 | | 25.1 | |
| To HCL | 0.8 | | 1.1 | | 1.5 | |
| | | | | | | |
| Total Recovery | 99.2 | | 98.4 | | 98.7 | |

See footnotes at end of table.

Table I—Continued

| Run | I | | II | | III | |
|---|---|---|---|---|---|---|
| | Solid | Liquid | Solid | Liquid | Solid | Liquid |
| Analysis: | | | | | | |
| Heat of Hydrolysis | | | | | | |
| ΔH, cal./g. | 425 | 361 | 451 | 402 | 454 | 401 |
| AlCl₃, Wt. Percent | | | | | 77.6 | 68.5 |
| By Titration, Wt. Percent— | | | | | | |
| AlCl₃ | 70.4 | 68.8 | 76.3 | 69.8 | 78.9 | 71.8 |
| Al₂O₃ | ᵈ 1.5 | ᵈ 0.4 | ᵈ 1.5 | ᵈ 0.4 | 1.5 | 0.4 |
| GaCl₃ | 9.5 | 1.1 | 2.7 | 0.8 | 0 | 0 |
| FeCl₃ | 0.4 | 0.4 | 0.4 | 0.8 | 0.4 | 0.5 |
| AlCl₃ (GaCl₃-free) | 77.8 | 69.6 | 78.4 | 70.4 | 78.9 | 71.8 |
| Material Balance (Titration)— | | | | | | |
| AlCl₃, Percent | 99 | | 92 | | 95 | |
| GaCl₃, Percent | 86 | | 102 | | — | |

ᵃ Based on pressure drop within the bomb, neglecting the partial pressure of light hydrocarbons produced in the reaction.
ᵇ Complex assumed to contain 42 wt. percent hydrocarbon, having an avg. mol. wt. of 220.
ᶜ At liquid nitrogen temperature.
ᵈ Because GaCl₃ interferes with analysis for Al₂O₃, the Al₂O₃ content was assumed to be that of the blank run for both solid and liquid phases.

EXAMPLE II

A series of runs similar to those in Example I was made using 16.8, 4.3 and 0.0 weight percent stannous chloride based on the weight of the complex. The threshold temperature in the hydrogenation reaction was lower in the stannous chloride promoted runs than in the run containing no stannous chloride. With the lower amount of stannous chloride, and in the run with no promoter, the reactivated catalyst complex was fluid. But with the run containing 16.8 percent stannous chloride the reactivated catalyst complex was entirely solid.

The compounds which act as promoters for the treatment described are each of them alternatives which can be employed separately or as an admixture of any one of them with any one or more of the others. These compounds are not necessarily equivalents each of the other.

Reasonable variation and modification are possible within the scope of the foregoing disclosure and the appended claims to the invention, the essence of which is that equilibrium or "spent" aluminum halide-hydrocarbon catalyst complex such as an aluminum chloride-hydrocarbon catalyst complex, which can be formed in a hydrocarbon conversion process employing the said complex as a catalyst in the hydrocarbon conversion process, is reactivated by hydrogenation more efficaciously by effecting the hydrogenation treatment in the presence of certain metal halides, as described, as hydrogenation promoters, to produce a catalyst complex which can be advantageously returned to the conversion process.

I claim:

1. The regeneration of an aluminum chloride-hydrocarbon catalyst complex by hydrogenation for a period from 0.5 to 10 hours, at a temperature in the range from 175° to 500° F. and at a pressure in the range from 500 to 4000 p.s.i.g. in the presence of hydrogen and a halide of at least one of the metals selected from the group consisting of gallium, indium, thallium and tin and thereby producing an aluminum chloride-hydrocarbon catalyst complex of increased activity.

2. The hydrogenation of an aluminum chloride-hydrocarbon catalyst complex for a period from 0.5 to 10 hours in the presence of a gallium chloride and thereby producing an aluminum chloride-hydrocarbon catalyst complex of increased activity, said hydrogenation being effected while maintaining said catalyst at a temperature in the range from 175 to 500° F. and at a pressure in the range from 500 to 4,000 p.s.i.g.

3. The hydrogenation of an aluminum chloride-hydrocarbon catalyst complex for a period from 0.5 to 10 hours in the presence of gallium trichloride and thereby producing an aluminum chloride-hydrocarbon catalyst complex of increased activity, said hydrogenation being effected while maintaining said catalyst at a temperature in the range from 175 to 500° F. and at a pressure in the range from 500 to 4,000 p.s.i.g.

4. The hydrogenation of an aluminum chloride-hydrocarbon catalyst complex for a period from 0.5 to 10 hours in a hydrogenation zone in the presence of a minor proportion of a chloride of at least one of the metals selected from the group consisting of gallium, indium, thallium and tin, while maintaining said catalyst at a temperature in the range from 175 to 500° F., and at a pressure in the range from 500–4000 p.s.i.g., while supplying hydrogen to the hydrogenation zone in an amount effective to accomplish said hydrogenation and thereby producing an aluminum chloride-hydrocarbon catalyst complex of increased activity.

5. The process of claim 4 wherein hydrogen chloride is supplied to the said hydrogenation zone.

6. The process of claim 4 wherein the said catalyst complex contains a minor portion of an aluminum chloride melting point depressant.

7. The process of claim 4 wherein a minor proportion of a hydrogen carrier is supplied to the said hydrogenation zone.

8. The process of claim 4 wherein the metal chloride is stannous chloride.

9. The regeneration by hydrogenation of an equilibrium aluminum chloride-hydrocarbon catalyst complex for a period from 0.5 to 10 hours in the presence of about 0.5 to 10 weight percent gallium trichloride while maintaining said catalyst at a temperature in the range from 175° to 500° F. and at a pressure in the range from 500 to 4000 p.s.i.g., and while supplying hydrogen to the hydrogenation zone in an amount effective to accomplish the hydrogenation and thereby producing an aluminum chloride-hydrocarbon catalyst complex of increased activity.

10. A process comprising: withdrawal of an equilibrium aluminum chloride-hydrocarbon catalyst complex from a hydrocarbon conversion zone, hydrogenation of said catalyst complex for a period from 0.5 to 10 hours in a hydrogenation zone in the presence of gallium trichloride at a hydrogenation temperature in the range from 175 to 500° F. and a hydrogenation pressure in the range from 500 to 4,000 p.s.i.g., while supplying hydrogen to said hydrogenation zone; recovering an aluminum chloride-hydrocarbon catalyst complex so produced and having increased activity from said hydrogenation zone, an increased proportion of said complex being a solid phase because of the use of said gallium trichloride, and returning at least part of the last-mentioned catalyst complex to said hydrocarbon conversion zone as catalyst for said conversion.

11. The process of claim 10 wherein the aluminum chloride catalyst complex of increased activity is a mixed phase catalyst containing both liquid and solid phases, 12. The process of claim 11 wherein the said mixed phase catalyst is separated into liquid and solid phases and the solid phase is returned to the said hydrocarbon conversion zone.

13. The hydrogenation of an aluminum chloride-hydrocarbon catalyst complex for a period from 0.5 to 10 hours in the presence of stannous chloride and thereby producing an aluminum chloride-hydrocarbon catalyst complex of increased activity, said hydrogenation being effected while maintaining said catalyst at a temperature in the range from 175 to 500° F. and at a pressure in the range from 500 to 4,000 p.s.i.g.

References Cited in the file of this patent

UNITED STATES PATENTS

| | | |
|---|---|---|
| 2,349,821 | Fragen | May 30, 1944 |
| 2,416,049 | Foster | Feb. 18, 1947 |
| 2,418,023 | Frey | Mar. 25, 1947 |